United States Patent
Hidaka et al.

(10) Patent No.: US 8,298,974 B2
(45) Date of Patent: Oct. 30, 2012

(54) OPTICAL GLASS

(75) Inventors: Tatsuo Hidaka, Hyogo (JP); Junichi Nakamura, Hyogo (JP); Takuro Ikeda, Hyogo (JP); Hidekazu Hashima, Hyogo (JP); Kohei Fukumi, Osaka (JP); Naoyuki Kitamura, Osaka (JP); Junji Nishii, Osaka (JP)

(73) Assignees: Nihon Yamamura Glass Co, Ltd., Hyogo (JP); National Institute of Advanced Industrial Science and Technology, Tokyo (JP)

( * ) Notice: Subject to any disclaimer, the term of this patent is extended or adjusted under 35 U.S.C. 154(b) by 42 days.

(21) Appl. No.: 13/119,751

(22) PCT Filed: Sep. 25, 2009

(86) PCT No.: PCT/JP2009/066597
§ 371 (c)(1),
(2), (4) Date: Mar. 18, 2011

(87) PCT Pub. No.: WO2010/035770
PCT Pub. Date: Apr. 1, 2010

(65) Prior Publication Data
US 2011/0172078 A1    Jul. 14, 2011

(30) Foreign Application Priority Data
Sep. 25, 2008  (JP) ................................. 2008-245569

(51) Int. Cl.
*C03C 3/066* (2006.01)
*C03C 3/068* (2006.01)

(52) U.S. Cl. ........................................... 501/78; 501/79

(58) Field of Classification Search .................... 501/78, 501/79
See application file for complete search history.

(56) References Cited

U.S. PATENT DOCUMENTS

| | | | |
|---|---|---|---|
| 7,704,904 B2 * | 4/2010 | Oogaki | 501/50 |
| 8,003,556 B2 * | 8/2011 | Suzuki et al. | 501/78 |
| 2008/0318758 A1 * | 12/2008 | Imakita et al. | 501/51 |

FOREIGN PATENT DOCUMENTS

| | | |
|---|---|---|
| JP | 60221338 A | 11/1985 |
| JP | 62100449 A | 5/1987 |
| JP | 859282 A | 3/1996 |
| JP | 2003238198 A | 8/2003 |

* cited by examiner

*Primary Examiner* — Karl Group
(74) *Attorney, Agent, or Firm* — Bacon & Thomas, PLLC

(57) ABSTRACT

An optical glass having a high refractive index (particularly preferably a refractive index of 1.6 or more), low dispersion (an Abbe number of 45 or more), a low deformation point, and improved resistance to devitrification upon molding, and suitable for precision-mold press molding or other molding processes and also suitable for transfer of a fine structure is provided. The optical glass contains 1.0-4.5 wt. % $SiO_2$, 30.5-50.0 wt. % $B_2O_3$, 1.1-8.0 wt. % $Li_2O$, 10.1-19.5 wt. % BaO, 15.5-30.0 wt. % ZnO, 3.0-15.0 wt. % $Y_2O_3$, and 10.0-19.5 wt. % $La_2O_3$.

13 Claims, No Drawings

OPTICAL GLASS

TECHNICAL FIELD

The present invention relates to an optical glass, and more particularly to an optical glass which has a high refractive index, low dispersion, a low deformation point, and is excellent in resistance to devitrification upon molding, and which has a composition suitable for molding and for transferring a fine structure.

BACKGROUND ART

In the recent significant development of smaller-size and lighter-weight optical equipment, aspherical lenses have been used increasingly. The aspherical lens is advantageous in that aberration of light can readily be corrected and that the number of lenses can be decreased so as to allow reduction in size of the equipment.

Besides the aspherical lenses, other uses of the optical glasses have been developed as well, and there is a demand for an optical glass which is capable of transferring a fine structure of a mold with high precision.

For fabricating an aspherical lens or the like, a glass preform is softened by heating, which is then formed into a desired shape by precision-mold press molding. There are generally two ways of obtaining the preform: one is to cut a piece of glass out of a glass block or bar and process it into a preform, and the other is to drop a molten glass from a distal end of a nozzle so as to obtain a glass preform in the spherical form.

In order to obtain a molded product of a glass by way of precision molding, it is necessary to press-mold the preform under the temperature condition near the deformation point (At). Therefore, when the preform has a higher deformation point (At), the mold coming into contact with the preform will be exposed to a higher temperature, causing the surface of the mold to suffer oxidization and corrosion. This gives rise to the need of maintenance of the mold, hindering mass production at a low cost. Accordingly, it is desired that the optical glass constituting the preform can be molded at a relatively low temperature, or, that it has a low glass transition point (Tg) and/or a low deformation point (At).

As to the glass used for a molded lens, a glass having various optical characteristics suitable for its specific use is demanded. In particular, there is an increasing demand for a glass having a high refractive index, low dispersion, and a low deformation point.

Among the conventional glasses, LaK type and LaF type glasses, for example, would meet the above-described demands. However, many of them have a relatively high deformation point, causing the mold susceptible to degradation, and thus, they are undesirable from the standpoint of durability improvement of the mold.

There has been disclosed a $B_2O_3$—$La_2O_3$—$Y_2O_3$—RO—$Li_2O$ type optical glass (where RO represents a divalent metal oxide) which has optical constants including a refractive index ($n_d$) of 1.62 to 1.85 and an Abbe number ($v_d$) of 35 to 65 (Patent Document 1).

However, those with a low glass transition point (Tg) and/or a low deformation point (At) exhibit poor resistance to devitrification. Moreover, there is no specific description about molding.

There is also disclosed a $B_2O_3$—$La_2O_3$—$ZnO$—$Li_2O$—$Sb_2O_3$ type optical glass which has optical constants including a refractive index ($n_d$) of 1.64 to 1.88 and an Abbe number ($v_d$) of 31 to 55. There is further disclosed a $B_2O_3$—$Li_2O$—$ZnO$—$La_2O_3$ type optical glass which has optical constants including a refractive index ($n_d$) of 1.66 to 1.77 and an Abbe number ($v_d$) of 43 to 55 (Patent Documents 2 and 3).

These optical glasses, however, pose the problems which are similar to those of Patent Document 1 described above.

There is also disclosed are $B_2O_3$—$SiO_2$—$La_2O_3$—$Y_2O_3$—$Li_2O$—$CaO$—$ZnO$ type optical glasses which each have a refractive index ($n_d$) of 1.67 or more, an Abbe number ($v_d$) of 50 or more, and a deformation point of 600° C. or lower (Patent Documents 4 and 5).

These optical glasses, however, each have a high deformation point of 530° C. or higher, causing the mold susceptible to degradation.

There is also disclosed a $B_2O_3$—$SiO_2$—$La_2O_3$—$Li_2O$—$SrO$—$ZrO_2$ type optical glass which has a refractive index ($n_d$) of 1.60 to 1.75, an Abbe number ($v_d$) of 50 to 60, and a glass transition temperature of 500° C. or lower (Patent Document 6).

This however contains a rare earth oxide in a large amount (22 to 43 wt. %), and it also contains $LiO_2$ in a relatively large amount for the purposes of lowering the glass transition temperature. Accordingly, although the glass may effectively satisfy the optical constants, it is subject to devitrification.

Also disclosed is a $B_2O_3$—$La_2O_3$—$ZnO_2$—$Gd_2O_3$ type optical glass which has a refractive index ($n_d$) of 1.65 to 1.75 and an Abbe number ($v_d$) of 45 or more (Patent Document 7).

This however contains $SiO_2$ in a large amount of 6% or more, and is lowered in basicity for the purposes of preventing the glass and the mold from fusing together. Thus, the glass transition point (Tg) and the deformation point (At) tend to become high, causing the mold susceptible to degradation.

There is further disclosed a $B_2O_3$—$SiO_2$—$La_2O_3$—$BaO$ type optical glass which has a refractive index ($n_d$) of 1.63 to 1.80 and an Abbe number ($v_d$) of 45 to 60 (Patent Document 8).

However, the contents of alkali oxides and ZnO, effective to lower the glass transition point (Tg) and the deformation point (At), are small. Accordingly, the deformation point tends to become high, causing the mold susceptible to degradation.

PRIOR ART DOCUMENTS

Patent Documents

Patent Document 1: Japanese Patent Application Laid-Open No. 60-221338
Patent Document 2: Japanese Patent Application Laid-Open No. 62-100449
Patent Document 3: Japanese Patent Application Laid-Open No. 8-26766
Patent Document 4: Japanese Patent Application Laid-Open No. 2000-16831
Patent Document 5: Japanese Patent Application Laid-Open No. 2001-130924
Patent Document 6: Japanese Patent Application Laid-Open No. 2006-321710
Patent Document 7: Japanese Patent Application Laid-Open No. 2007-137701
Patent Document 8: Japanese Patent Application Laid-Open No. 2008-19104

DISCLOSURE OF THE INVENTION

Problems to be Solved by the Invention

In view of the foregoing, an object of the present invention is to provide an optical glass which can solve the above-described problems of the conventional optical glasses, which has a high refractive index (particularly preferably a refractive index of 1.6 or more), low dispersion (an Abbe number of 45 or more), a low deformation point, and improved resistance to devitrification upon molding, and which is suitable for precision-mold press molding or other molding processes and also suitable for transferring a fine structure.

Means for Solving the Problems

To solve the above-described problems, the inventors have vigorously carried out investigations, and found out that the above problems can be solved by fabricating a glass so as to have a particular composition, specifically on the basis of a $SiO_2$—$B_2O_3$—$Li_2O$—$BaO$—$ZnO$—$Y_2O_3$—$La_2O_3$ type glass, by mixing alkali metal oxides as appropriate, and by mixing rare earth oxides in an appropriate amount, and they have finally completed the present invention.

Specifically, an optical glass according to the present invention has a first feature that it contains: 1.0-4.5 wt. % $SiO_2$, 30.5-50.0 wt. % $B_2O_3$, 1.1-8.0 wt. % $Li_2O$, 10.1-19.5 wt. % $BaO$, 15.5-30.0 wt. % $ZnO$, 3.0-15.0 wt. % $Y_2O_3$, and 10.0-19.5 wt. % $La_2O_3$.

Further, the optical glass according to the present invention has, in addition to the first feature described above, a second feature that $Yb_2O_3$ is contained in an amount of 3.0 wt. % or less.

Furthermore, the optical glass according to the present invention has, in addition to the first or second feature described above, a third feature that $Yb_2O_3$ and $Gd_2O_3$ are contained in an amount of 9.0 wt. % or less in total.

Furthermore, the optical glass according to the present invention has, in addition to any of the first through third features described above, a fourth feature that it contains at least one of: 5.0 wt. % or less $GeO_2$, 5.0 wt. % or less $Al_2O_3$, 10.0 wt. % or less $Na_2O$, 10.0 wt. % or less $K_2O$, 10.0 wt. % or less $MgO$, 10.0 wt. % or less $CaO$, 10.0 wt. % or less $SrO$, 10.0 wt. % or less $ZrO_2$, 10.0 wt. % or less $Nb_2O_5$, 10.0 wt. % or less $Ta_2O_5$, 10.0 wt. % or less $WO_3$, 5.0 wt. % or less $ZnF_2$, 5.0 wt. % or less $BaF_2$, and 4.0 wt. % or less F.

Furthermore, the optical glass according to the present invention has a fifth feature that it contains: 1.0-4.0 wt. % $SiO_2$, 34.0-40.0 wt. % $B_2O_3$, 3.0-8.0 wt. % $Li_2O$, 1.0-4.0 wt. % $Na_2O$, 11.0-18.0 wt. % $BaO$, 15.5-25.0 wt. % $ZnO$, 3.0-6.0 wt. % $Y_2O_3$, 10.0-15.0 wt. % $La_2O_3$, 3.0-8.0 wt. % $Gd_2O_3$, 0.5-5.0 wt. % $ZrO_2$, and 0.5-5.0 wt. % $Al_2O_3$.

Furthermore, the optical glass according to the present invention has, in addition to any of the first through fifth features described above, a sixth feature that it has a refractive index ($n_d$) of 1.60 to 1.70, an Abbe number ($v_d$) of 45 to 60, a glass transition point (Tg) of 500° C. or lower, and a glass deformation point (At) of 530° C. or lower.

In the above description, the refractive index ($n_d$) refers to a refractive index with respect to the 587.6 nm helium emission line. The Abbe number ($v_d$) is defined as: $v_d=(n_d-1)/(n_F-n_C)$, where $n_F$ and $n_C$ represent refractive indices with respect to the 486.1 nm and 656.3 nm hydrogen emission lines, respectively. The deformation point (At) refers to, in the case where thermal expansion is measured using a thermo mechanical analyzer (TMA), a maximum point at which an expansion curve changes from an upward curve to a downward curve due to softening of the glass.

Effects of the Invention

According to the optical glass recited in claim 1, by virtue of the composition recited therein, it has become possible to provide an optical glass which has a high refractive index, low dispersion, a low glass transition point, and a low deformation point, which is unlikely to suffer generation of cloudiness on the surface upon molding, and which is suitable for precision-mold press molding or other molding processes and also suitable for transferring a fine structure.

It is of course free of lead and thus is safe.

According to the optical glass recited in claim 2, $Yb_2O_3$ is contained in an amount of 3.0 wt. % or less, and accordingly, in addition to the effects obtained by the configuration recited in claim 1, stability of the optical glass can be increased, and formability thereof can further be improved.

According to the optical glass recited in claim 3, $Yb_2O_3$ and $Gd_2O_3$ are contained in an amount of 9.0 wt. % or less in total, and thus, similarly, in addition to the effects obtained by the configuration recited in claim 1 or 2, stability of the optical glass can be increased, and formability thereof can further be improved.

According to the optical glass recited in claim 4, by virtue of the configuration recited therein, in addition to the effects obtained by the configuration recited in any of claims 1 to 3, it is possible to adjust or modify the characteristics of the optical glass in accordance with its use, or provide the optical glass with additional characteristics, while securing its characteristics that it has a high refractive index, low dispersion, a low glass transition point, and a low deformation point, that it is unlikely to suffer generation of cloudiness, and that it is suitable for precision-mold press molding and for transferring a fine structure.

According to the optical glass recited in claim 5, by virtue of the composition recited therein, it is possible to provide an optical glass which has a high refractive index, low dispersion, a low glass transition point, and a low deformation point, which is unlikely to suffer generation of cloudiness, which is suitable for precision-mold press molding and for transferring a fine structure, and which is excellent in chemical durability as well, and it is also possible to adjust or modify these characteristics of the optical glass in accordance with its use, or provide the optical glass with additional characteristics.

According to the optical glass recited in claim 6, it has a refractive index ($n_d$) of 1.60 to 1.70, an Abbe number ($v_d$) of 45 to 60, a glass transition point (Tg) of 500° C. or lower, and a glass deformation point (At) of 530° C. or lower, and accordingly, in addition to the effects obtained by the configuration recited in any of claims 1 to 5, it is possible to provide the optical glass which actually has a high refractive index and low dispersion, which is excellent in formability under a low temperature condition, and which can elongate the life of the mold.

BEST MODES FOR CARRYING OUT THE INVENTION

Hereinafter, components and their contents in the optical glass of the present invention will be described.

The component $SiO_2$ forms the glass network structure. It is an essential component for imparting stability enabling fabrication to the glass.

$SiO_2$ is contained in an amount of 1.0-4.5 wt. %. If the content exceeds 4.5 wt. %©, the deformation point of the glass will become high, and it will be difficult to obtain a glass having a sufficiently high refractive index. If the content is less than 1.0 wt. %, stability of the glass will be deteriorated.

In consideration of stability, refractive index, and other properties of the glass, the content of $SiO_2$ is more preferably 1.0-4.0 wt. %, and still more preferably 1.5-3.5 wt. %.

The component $B_2O_3$, likewise the component $SiO_2$, forms the glass network structure, and is an essential component for stabilizing the glass.

$B_2O_3$ is contained in an amount of 30.5-50.0 wt. %. If the content is less than 30.5 wt. %, stability of the glass will be impaired. If the content exceeds 50.0 wt. %, it will be difficult to obtain a glass having a sufficiently high refractive index.

In consideration of stability, refractive index, and other properties of the glass, the content of $B_2O_3$ is more preferably 31.0-45.0 wt. %, still more preferably 32.0-43.0 wt. %, and most preferably 34.0-40.0 wt. %.

$Li_2O$ is an essential component for lowering the glass transition point and at the same time maintaining a favorable refractive index.

$Li_2O$ is contained in an amount of 1.1-8.0 wt. %. If the content is less than 1.1 wt. %, it will not be able to lower the deformation point of the glass effectively. If the content exceeds 8.0 wt. %, stability of the glass will be impaired.

In consideration of stability, refractive index, and other properties of the glass, the content of $Li_2O$ is more preferably 1.5-7.0 wt. %, still more preferably 2.0-7.0 wt. %, and most preferably 3.0-7.0 wt.

The component BaO is essential in order to improve the stability of the glass and to lower the deformation point and the liquidus temperature.

BaO is contained in an amount of 10.1-19.5 wt. %. If the content is less than 10.1 wt. %, the deformation point will become high, which is unfavorable in terms of stability of the glass. If the content exceeds 19.5 wt. %, the stability of the glass will be impaired.

In consideration of formability, refractive index, and other properties of the glass, the content of BaO is more preferably 12.0-18.0 wt. %, and still more preferably 14.0-18.0 wt. %.

The component ZnO is essential in order to restrict devitrification upon molding of the glass and to improve formability of the glass by lowering the deformation point.

ZnO is contained in an amount of 15.5-30.0 wt. %. If the content is less than 15.0 wt. %, the effect of lowering the deformation point will be insufficient. Tithe content exceeds 30.0 wt. %, the stability of the glass will be impaired unfavorably.

In consideration of formability and stability of the glass, as well as the glass transition point and deformation point, the content of ZnO is more preferably 15.5-25.0 wt. %, and still more preferably 15.5-22.0 wt. %.

The component $Y_2O_3$ is essential in order to increase the refractive index and the Abbe number of the glass.

$Y_2O_3$ is contained in an amount of 3.0-15.0 wt. %. If the content is less than 3.0 wt. %, sufficiently high refractive index and the Abbe number will not be able to be obtained. If the content exceeds 15.0 wt. %, the deformation point will become high. It is also unfavorable in terms of stability of the glass.

In consideration of formability, refractive index, and other properties of the glass, the content of $Y_2O_3$ is more preferably 3.0-12.0 wt. %, still more preferably 3.0-10.0 wt. %, and most preferably 3.0-6.0 wt. %.

The component $La_2O_3$ is essential in order to increase the refractive index and the Abbe number of the glass.

$La_2O_3$ is contained in an amount of 10.0-19.5 wt. %. If the content is less than 10.0 wt. %, sufficiently high refractive index and the Abbe number will not be able to be obtained. If the content exceeds 19.5 wt. %, the deformation point will become high. It is also unfavorable in terms of stability of the glass.

In consideration of formability, refractive index, and other properties of the glass, the content of $La_2O_3$ is more preferably 10.0-18.0 wt. %, and still more preferably 10.0-15.0 wt. %.

The component $Yb_2O_3$ is effective for increasing the stability of the glass and for improving the formability thereof. Although it is an optional component, it is preferably contained in an amount of 3.0 wt. % or less. If the content exceeds 3.0 wt. %, it will cause a decrease of stability of the refractive index of the glass.

In consideration of stability and formability of the glass, the content of $Yb_2O_3$ is more preferably 0.1-3.0 wt. %, and still more preferably 0.1-2.0 wt. %.

The component $Gd_2O_3$ is effective for increasing the stability of the glass and for improving the formability thereof. Although it is an optional component, it is preferably contained in an amount of 9.0 wt. % or less. If the content exceeds 9.0 wt. %, it will cause a decrease of stability of the glass.

In consideration of stability and formability of the glass, the content of $Gd_2O_3$ is more preferably 0.1-8.0 wt. %, still more preferably 1.0-6.0 wt. %, and most preferably 3.0-6.0 wt. %.

In the case where the components $Yb_2O_3$ and $Gd_2O_3$ described above are to be contained together, they are contained in an amount of 9.0 wt. % or less in total. Stated differently, the four components of $Y_2O_3$, $La_2O_3$, $Yb_2O_3$, and $Gd_2O_3$ are contained in an amount of 13.0-22.0 wt. % or less in total. Containing the components in this range is preferable for enhancing the stability of the glass as well as for obtaining desired optical constants. If the total content of the four components exceeds 22 wt. %, stability of the glass will be impaired. If the total content of the four components is less than 13 wt. %, desired optical constants will not be able to be obtained.

The component $GeO_2$ also forms the glass network structure so as to stabilize the glass. While it can increase the refractive index effectively, the component is expensive in terms of cost. It may be contained as an optional component in an amount of 5.0 wt. % or less. If the content exceeds 5.0 wt. %, the fabrication of the glass will become costly.

In consideration of stabilization of the glass as well as cost, the content of $GeO_2$ is more preferably 4.0 wt. % or less, and still more preferably 3.0 wt. % or less.

The component $Al_2O_3$ is effective for restricting devitrification upon molding, and can also improve climate resistance. It may be contained as an optional component in an amount of 5.0 wt. % or less. If the content exceeds 5.0 wt. %, the liquidus temperature of the glass will increase, and the refractive index will decrease unfavorably.

In consideration of the liquidus temperature and refractive index of the glass, the content of $Al_2O_3$ is more preferably 4.0 wt. % or less, still more preferably 3.0 wt. % or less, and most preferably 0.5-3.0 wt. %.

The component $Na_2O$ is effective for lowering the glass transition point. It may be contained as an optional component in an amount of 10.0 wt. % or less. If the content exceeds 10.0 wt. %, it will cause a decrease of the refractive index of the glass.

In consideration of the glass transition point and refractive index, the content of $Na_2O$ is more preferably 0.1-10.0 wt. %, still more preferably 1.0-8.0 wt. %, and most preferably 1.0-4.0 wt. %.

The component $K_2O$ is also effective for lowering the glass transition point. It may be contained as an optional component in an amount of 10.0 wt. % or less. If the content exceeds 10.0 wt. %, it will cause a decrease of the refractive index of the glass.

In consideration of the glass transition point and refractive index, the content of $K_2O$ is more preferably 0.1-10.0 wt. %, and still more preferably 1.0-8.0 wt. %.

The component MgO is effective for increasing the stability of the glass and for improving formability thereof. It may be contained as an optional component in an amount of 10.0 wt. % or less. If the content exceeds 10.0 wt. %, it will cause a decrease of the refractive index of the glass.

In consideration of formability and refractive index of the glass, the content of MgO is more preferably 0.1-8.0 wt. %, and still more preferably 1.0-6.0 wt. %.

The component CaO is effective for increasing the stability of the glass and for improving formability thereof. It may be contained as an optional component in an amount of 10.0 wt. % or less. If the content exceeds 10.0 wt. %, it will cause a decrease of the refractive index of the glass.

In consideration of formability and refractive index of the glass, the content of CaO is more preferably 0.1-8.0 wt. %, and still more preferably 1.0-6.0 wt. %.

The component SrO is effective for increasing the stability of the glass and for improving formability thereof. It may be contained as an optional component in an amount of 10.0 wt. % or less. If the content exceeds 10.0 wt. %, it will cause a decrease of the refractive index of the glass.

In consideration of formability and refractive index of the glass, the content of SrO is more preferably 0.1-8.0 wt. %, and still more preferably 1.0-6.0 wt. %.

The component $ZrO2$ is effective for increasing the refractive index and the Abbe number of the glass, and for increasing the stability of the glass. It may be contained as an optional component in an amount of 10.0 wt. % or less. If the content exceeds 10.0 wt. %, it will cause a decrease of stability of the glass.

In consideration of the refractive index, the Abbe number, and formability of the glass, the content of $ZrO_2$ is more preferably 0.1-8.0 wt. %, still more preferably 0.1-5.0 wt. %, and most preferably 0.5-5.0 wt. %.

The component $Nb_2O_5$ is an effective component that most contributes to a high refractive index of the glass. It may be contained as an optional component in an amount of 10.0 wt. % or less. If the content exceeds 10.0 wt. %, it will cause a decrease of stability of the glass.

In consideration of the refractive index of the glass, the content of $Nb_2O_5$ is more preferably 0.1-8.0 wt. %, and still more preferably 0.1-5.0 wt. %.

The component $Ta_2O_5$ is effective for increasing the refractive index and the Abbe number of the glass, and for increasing the stability of the glass. The component however is expensive, leading to increased cost of fabrication of the glass. It may be contained as an optional component in an amount of 10.0 wt. % or less. If the content exceeds 10.0 wt. %, it will cause a decrease of stability of the glass.

In consideration of the refractive index, the Abbe number, and stability of the glass, the content of $Ta_2O_5$ is more preferably 0.1-8.0 wt. %, and still more preferably 0.1-5.0 wt. %.

The component $WO_3$ is an effective component for imparting a high refractive index to the glass, and also imparting favorable formability at a low deformation point. It may be contained as an optional component in an amount of 10.0 wt. % or less. If the content exceeds 10.0 wt. %, the stability of the glass will be impaired.

In consideration of the refractive index, formability, and stability of the glass, the content of $WO_3$ is more preferably 0.1-10.0 wt. %, and still more preferably 1.0-8.0 wt. %.

The components $ZnF_2$ and $BaF_2$ are effective for improving the meltability of the glass and for lowering the deformation point and liquidus temperature thereof. They are also effective for improving the climate resistance of the glass. Each of them may be contained as an optional component in an amount of 5.0 wt. % or less. If the content exceeds 5.0 wt. %, the stability of the glass will be impaired.

In consideration of formability and stability of the glass, the content of each of $ZnF_2$ and $BaF_2$ is more preferably 4.5 wt. % or less.

The component F contained in the glass is an effective component for improving the meltability of the glass and for improving the climate resistance thereof. It may be contained as an optional component in an amount of 4.0 wt. % or less. If the content exceeds 4.0 wt. %, the stability of the glass will be impaired.

In consideration of stability of the glass, the content of F is more preferably 0.1-3.0 wt. %, and still more preferably 0.1-2.0 wt. %.

For the raw materials for fabricating the optical glass of an embodiment, $H_3BO_3$, $B_2O_3$, and the like may be used for the component $B_2O_3$, for example. For the other components, any raw materials commonly used for the optical glass, such as oxides, carbonates, nitrates, and others, may be used.

When these raw materials are prepared and mixed in the above-described component ranges, melted at 1100° C. to 1400° C., homogenized through fining (gas removal), stirring, and other processing, and poured into the mold and cooled gradually, then an optical glass of the present invention can be obtained which has no color, a high refractive index, and a low deformation point, and which is transparent, homogeneous, and excellent in processability.

The following (1) through (5) are specific examples of highly preferable compositions for achieving the optical glasses that have a high refractive index, low dispersion, and a low deformation point, fulfilling the object of the present invention. These optical glasses are excellent in chemical durability as well.

(1) A glass composed of: 1.0-4.0 wt. % $SiO_2$, 34.0-40.0 wt. % $B_2O_3$, 3.0-8.0 wt. % $Li_2O$, 11.0-18.0 wt. % BaO, 15.5-25.0 wt. % ZnO, 3.0-6.0 wt. % $Y_2O_3$, 10.0-15.0 wt. % $La_2O_3$, and 3.0-8.0 wt. % $Gd_2O_3$.

(2) A glass composed of: 1.0-4.0 wt. % $SiO_2$, 34.0-40.0 wt. % $B_2O_3$, 3.0-8.0 wt. % $Li_2O$, 1.0-4.0 wt. % $Na_2O$, 11.0-18.0 wt. % BaO, 15.5-25.0 wt. % ZnO, 3.0-6.0 wt. % $Y_2O_3$, 10.0-15.0 wt. % $La_2O_3$, and 3.0-8.0 wt. % $Gd_2O_3$.

(3) A glass composed of 1.0-4.0 wt. % $SiO_2$, 34.0-40.0 wt. % $B_2O_3$, 3.0-8.0 wt. % $Li_2O$, 1.0-4.0 wt. % $Na_2O$, 11.0-18.0 wt. % BaO, 15.5-25.0 wt. % ZnO, 3.0-6.0 wt. % $Y_2O_3$, 10.0-15.0 wt. % $La_2O_3$, 3.0-8.0 wt. % $Gd_2O_3$, and 0.5-5.0 wt. % $ZrO_2$.

(4) A glass composed of: 1.0-4.0 wt. % $SiO_2$, 34.0-40.0 wt. % $B_2O_3$, 3.0-8.0 wt. % $Li_2O$, 1.0-4.0 wt. % $Na_2O$, 11.0-18.0 wt. % BaO, 15.5-25.0 wt. % ZnO, 3.0-6.0 wt. % $Y_2O_3$, 10.0-15.0 wt. % $La_2O_3$, 3.0-8.0 wt. % $Gd_2O_3$, and 0.5-5.0 wt. % $Al_2O_3$.

(5) A glass composed of: 1.0-4.0 wt. % $SiO_2$, 34.0-40.0 wt. % $B_2O_3$, 3.0-8.0 wt. % $Li_2O$, 1.0-4.0 wt. % $Na_2O$, 11.0-18.0 wt. % BaO, 15.5-25.0 wt. % ZnO, 3.0-6.0 wt. % $Y_2O_3$, 10.0-15.0 wt. % $La_2O_3$, 3.0-8.0 wt. % $Gd_2O_3$, 0.5-5.0 wt. % $ZrO_2$, and 0.5-5.0 wt. % $Al_2O_3$.

EXAMPLES

Hereinafter, the present invention will further be described by giving examples, although the present invention is not restricted to the examples by any means.

Raw materials were prepared and mixed to achieve the compositions of Examples 1 to 24 and Comparative Examples 1 to 5 shown in Tables 1 to 4. The mixed raw materials for each composition were introduced into a platinum crucible, and melted in an electric furnace at 1100° C. to 1400° C. The melt was then poured into a mold, and allowed to cool slowly, whereby an optical glass was obtained.

For each of the obtained optical glasses, a refractive index ($n_d$), an Abbe number ($v_d$), a deformation point (At), and a glass transition point (Tg) were measured. Moreover, a microscope was used to check for any defects such as cloudiness.

Next, each glass plate was cut into dice to obtain a plurality of cut pieces of the same size. The molded surfaces of the cut pieces were subjected to mirror polishing, and the samples were rinsed to obtain glass preforms for use in press molding.

The glass preform for molding was introduced into a press molding machine having an upper core and a lower core provided with rare metal-type mold release films. The glass preform was heated to a temperature range from the deformation point (At) to a temperature about 20° C. higher than the deformation point (At), under the $N_2$ gas or vacuum atmosphere, and then applied with pressure for press molding. It was then cooled before being taken out as a press-molded product.

Cloudiness on the core surface, if any, is due to the components volatilized from the glass, indicating the presence of fine roughness on the press-molded surface.

It is noted that Comparative Examples 1 and 2 have the compositions identical to those of the glasses of Examples 1 and 10, respectively, in Patent Document 7. Comparative Examples 3 to 5 have the compositions identical to those of the glasses of Examples 9 to 11, respectively, in Patent Document 8.

For each of the Examples and Comparative Examples, the refractive index ($n_d$) and the Abbe number ($v_d$) were measured using a refractometer (available from Kalnew Co., Ltd.; KPR-200).

For measuring the glass transition point (Tg) and the deformation point (At), a rod-shaped sample having a length of 15-20 mm and a diameter (side) of 3-5 mm was heated, with the temperature increased at a constant rate of 5° C. per minute, during which elongation and temperature of the sample were measured to obtain a thermal expansion curve. The glass transition point and the deformation point were calculated from the thermal expansion curve.

The measurement results are shown in Tables 1 to 4.

TABLE 1

| | | Example 1 | Example 2 | Example 3 | Example 4 | Example 5 | Example 6 | Example 7 | Example 8 |
|---|---|---|---|---|---|---|---|---|---|
| Glass Composition (wt. %) | $SiO_2$ | 1.9 | 1.6 | 1.8 | 1.4 | 2.0 | 4.2 | 1.5 | 1.8 |
| | $B_2O_3$ | 30.8 | 33.5 | 32.2 | 32.1 | 32.6 | 32.6 | 33.2 | 32.7 |
| | $GeO_2$ | | | | | | | | |
| | $Al_2O_3$ | | | | 1.0 | | | | |
| | $Li_2O$ | 1.1 | 1.3 | 2.9 | 1.7 | 7.5 | 7.2 | 1.2 | 2.9 |
| | $Na_2O$ | | 8.4 | | 7.5 | | | 7.8 | |
| | $K_2O$ | 6.6 | | 4.9 | | | | | 4.9 |
| | MgO | | 7.1 | | | | | | |
| | CaO | | | | | 3.3 | 8.2 | | |
| | SrO | | | | | | | | |
| | BaO | 10.7 | 10.2 | 17.5 | 13.3 | 11.5 | 11.1 | 10.8 | 17.8 |
| | $BaF_2$ | | | | | | | | |
| | ZnO | 25.7 | 17.4 | 17.8 | 16.3 | 15.7 | 16.8 | 16.9 | 18.1 |
| | $ZnF_2$ | | | | | | | | |
| | $Y_2O_3$ | 4.5 | 3.2 | 5.0 | 5.0 | 5.9 | 7.3 | 8.8 | 4.3 |
| | $La_2O_3$ | 10.3 | 17.4 | 11.4 | 14.2 | 11.7 | 12.6 | 11.7 | 10.8 |
| | $Gd_2O_3$ | | | | | | | | 5.8 |
| | $Yb_2O_3$ | 1.93 | 0.04 | 0.71 | 0.71 | 0.05 | 0.05 | 0.74 | 0.72 |
| | $Sb_2O_3$ | | | | | | | | |
| | $ZrO_2$ | | | | | 9.8 | | | |
| | $Nb_2O_5$ | | | 5.0 | | | | 7.4 | |
| | $Ta_2O_5$ | 6.4 | | | | | | | |
| | $WO_3$ | | | | 7.8 | | | | |
| | Total | 100 | 100 | 100 | 100 | 100 | 100 | 100 | 100 |
| $Y_2O_3 + La_2O_3 + Gd_2O_3 + Yb_2O_3$ (wt. %) | | 16.7 | 20.6 | 17.0 | 19.8 | 17.6 | 19.9 | 21.3 | 21.7 |
| Amount of F (wt. %) | | 0.0 | 0.0 | 0.0 | 0.0 | 0.0 | 0.0 | 0.0 | 0.0 |
| Refractive Index $n_d$ | | 1.6674 | 1.6470 | 1.6722 | 1.6567 | 1.6906 | 1.6699 | 1.6780 | 1.6591 |
| Abbe Number $v_d$ | | 47.9 | 52.6 | 49.5 | 50.1 | 49.8 | 53.0 | 47.2 | 52.3 |
| Glass Transition Point Tg (° C.) | | 486 | 460 | 475 | 456 | 444 | 445 | 476 | 466 |
| Deformation Point At (° C.) | | 527 | 499 | 517 | 495 | 480 | 482 | 520 | 507 |

TABLE 2

| | | Example 9 | Example 10 | Example 11 | Example 12 | Example 13 | Example 14 | Example 15 | Example 16 |
|---|---|---|---|---|---|---|---|---|---|
| Glass Composition (wt. %) | $SiO_2$ | 2.0 | 2.1 | 2.2 | 1.6 | 1.1 | 1.8 | 1.8 | 1.8 |
| | $B_2O_3$ | 33.1 | 34.5 | 36.0 | 34.3 | 39.9 | 38.3 | 38.5 | 38.9 |
| | $GeO_2$ | 4.0 | | | | | | | |
| | $Al_2O_3$ | | | 4.1 | | | | | |
| | $Li_2O$ | 7.6 | 7.9 | 7.0 | 1.3 | 7.1 | 6.2 | 6.3 | 6.3 |
| | $Na_2O$ | | | | 8.6 | | | | |
| | $K_2O$ | | | | | | | | |
| | MgO | | | | 7.3 | | | | |
| | CaO | 7.8 | | | | | | | 1.0 |
| | SrO | | | | | 8.0 | | | |
| | BaO | 11.6 | 12.1 | 12.7 | 10.4 | 10.3 | 15.6 | 15.7 | 14.5 |
| | $BaF_2$ | | 4.1 | | | | | | |
| | ZnO | 15.9 | 16.6 | 17.3 | 17.8 | 15.9 | 16.7 | 16.8 | 16.9 |
| | $ZnF_2$ | | | 4.3 | | | | | |
| | $Y_2O_3$ | 6.0 | 6.2 | 6.5 | 3.2 | 5.3 | 3.6 | 3.6 | 3.6 |
| | $La_2O_3$ | 11.9 | 12.4 | 12.9 | 15.4 | 12.3 | 14.5 | 13.2 | 13.3 |
| | $Gd_2O_3$ | | | | | | 3.3 | 3.1 | 3.2 |
| | $Yb_2O_3$ | 0.05 | 0.05 | 1.08 | 0.04 | 0.04 | 0.11 | 0.1 | 0.11 |
| | $Sb_2O_3$ | | | | | | | | |
| | $ZrO_2$ | | | | | | | 1.0 | 0.5 |
| | $Nb_2O_5$ | | | | | | | | |
| | $Ta_2O_5$ | | | | | | | | |
| | $WO_3$ | | | | | | | | |
| | Total | 100 | 100 | 100 | 100 | 100 | 100 | 100 | 100 |
| $Y_2O_3 + La_2O_3 + Gd_2O_3 + Yb_2O_3$ (wt. %) | | 17.9 | 18.6 | 20.5 | 18.6 | 17.6 | 21.4 | 20.0 | 20.1 |
| Amount of F (wt. %) | | 0.0 | 0.9 | 1.6 | 0.0 | 0.0 | 0.0 | 0.0 | 0.0 |
| Refractive Index $n_d$ | | 1.6683 | 1.6535 | 1.6601 | 1.6387 | 1.6563 | 1.6671 | 1.6669 | 1.6653 |
| Abbe Number $\nu_d$ | | 52.6 | 54.2 | 54.7 | 52.3 | 55.2 | 54.4 | 53.4 | 54.7 |
| Glass Transition Point Tg (° C.) | | 441 | 436 | 448 | 460 | 461 | 472 | 474 | 474 |
| Deformation Point At (° C.) | | 476 | 474 | 488 | 501 | 497 | 507 | 509 | 510 |

TABLE 3

| | | Example 17 | Example 18 | Example 19 | Example 20 | Example 21 | Example 22 | Example 23 | Example 24 |
|---|---|---|---|---|---|---|---|---|---|
| Glass Composition (wt. %) | $SiO_2$ | 1.5 | 1.6 | 2.2 | 2.2 | 2.2 | 2.2 | 2.1 | 2.2 |
| | $B_2O_3$ | 44.2 | 36.5 | 37.6 | 36.5 | 35.4 | 35.4 | 34.9 | 35.2 |
| | $GeO_2$ | | | | | | | | |
| | $Al_2O_3$ | | | | | | 1.3 | 1.3 | 2.1 |
| | $Li_2O$ | 6.6 | 4.9 | 6.3 | 4.4 | 4.4 | 4.4 | 4.3 | 3.5 |
| | $Na_2O$ | | 4.7 | | 3.5 | 3.5 | 3.5 | 3.4 | 5.1 |
| | $K_2O$ | | | | | | | | |
| | MgO | | | | | | | | |
| | CaO | | | | | | | | |
| | SrO | 1.0 | | | | | | | |
| | BaO | 13.1 | 11.8 | 15.7 | 13.3 | 13.3 | 13.3 | 13.1 | 13.9 |
| | $BaF_2$ | | | | | | | | |
| | ZnO | 18.6 | 18.6 | 16.8 | 19.5 | 19.5 | 19.5 | 19.2 | 15.5 |
| | $ZnF_2$ | | | | | | | | |
| | $Y_2O_3$ | 4.5 | 10.9 | 3.6 | 3.5 | 3.5 | 3.5 | 3.4 | 3.4 |
| | $La_2O_3$ | 10.4 | 10.9 | 12.1 | 11.7 | 11.6 | 11.6 | 11.5 | 11.6 |
| | $Gd_2O_3$ | | | 5.7 | 5.5 | 5.5 | 5.5 | 5.4 | 5.4 |
| | $Yb_2O_3$ | 0.04 | 0.08 | | | | | | |
| | $Sb_2O_3$ | | | | | | | | |
| | $ZrO_2$ | | | | | | 1.3 | 1.3 | 2.2 |
| | $Nb_2O_5$ | | | | | | | | |
| | $Ta_2O_5$ | | | | | | | | |
| | $WO_3$ | | | | | | | | |
| | Total | 100 | 100 | 100 | 100 | 100 | 100 | 100 | 100 |
| $Y_2O_3 + La_2O_3 + Gd_2O_3 + Yb_2O_3$ (wt. %) | | 14.9 | 21.8 | 21.3 | 20.6 | 20.6 | 20.6 | 20.3 | 20.5 |
| Amount of F (wt. %) | | 0.0 | 0.0 | 0.0 | 0.0 | 0.0 | 0.0 | 0.0 | 0.0 |

TABLE 3-continued

|  | Example 17 | Example 18 | Example 19 | Example 20 | Example 21 | Example 22 | Example 23 | Example 24 |
|---|---|---|---|---|---|---|---|---|
| Refractive Index $n_d$ | 1.6480 | 1.6525 | 1.6658 | 1.6588 | 1.6614 | 1.6576 | 1.6604 | 1.6533 |
| Abbe Number $v_d$ | 55.8 | 54.0 | 54.6 | 54.0 | 53.4 | 53.4 | 53.0 | 53.1 |
| Glass Transition Point Tg (° C.) | 484 | 446 | 466 | 454 | 452 | 451 | 447 | 456 |
| Deformation Point At (° C.) | 522 | 486 | 502 | 490 | 491 | 488 | 486 | 495 |

TABLE 4

| | | Comparative Example 1 | Comparative Example 2 | Comparative Example 3 | Comparative Example 4 | Comparative Example 5 |
|---|---|---|---|---|---|---|
| Glass Composition (wt. %) | $SiO_2$ | 12.2 | 14.0 | 6.3 | 6.4 | 6.6 |
| | $B_2O_3$ | 29.2 | 34.7 | 38.4 | 38.5 | 38.5 |
| | $GeO_2$ | | | | | |
| | $Al_2O_3$ | | | 0.2 | | |
| | $Li_2O$ | 3.9 | 6.1 | 0.3 | 0.3 | |
| | $Na_2O$ | | | | | 0.3 |
| | $K_2O$ | | | 0.3 | | |
| | MgO | | | | | 1.1 |
| | CaO | | | 5.3 | 5.6 | 4.5 |
| | SrO | | | | | |
| | BaO | | | 4.4 | 4.0 | 4.3 |
| | $BaF_2$ | | | | | |
| | ZnO | 13.7 | 13.5 | 3.3 | 3.5 | 3.1 |
| | $ZnF_2$ | | | | | |
| | $Y_2O_3$ | | 13.0 | | | |
| | $La_2O_3$ | 30.8 | 7.0 | 36.1 | 39.2 | 39.1 |
| | $Gd_2O_3$ | 5.7 | 11.7 | 2.9 | | 2.5 |
| | $Yb_2O_3$ | | | | | |
| | $Sb_2O_3$ | | | 0.1 | 0.02 | 0.03 |
| | $ZrO_2$ | 1.3 | | 2.5 | 2.5 | |
| | $Nb_2O_5$ | | | | | |
| | $Ta_2O_5$ | 3.2 | | | | |
| | $WO_3$ | | | | | |
| | Total | 100 | 100 | 100 | 100 | 100 |
| $Y_2O_3 + La_2O_3 + Gd_2O_3 + Yb_2O_3$ (wt. %) | | 36.5 | 31.7 | 39.0 | 39.2 | 41.6 |
| Amount of F (wt. %) | | 0.0 | 0.0 | 0.0 | 0.0 | 0.0 |
| Refractive Index $n_d$ | | 1.6960 | 1.6637 | 1.6905 | 1.6935 | 1.6867 |
| Abbe Number $v_d$ | | 52.7 | 54.9 | 55.5 | 56.7 | 56.7 |
| Glass Transition Point Tg (° C.) | | 540 | 525 | 623 | 622 | 631 |
| Deformation Point At (° C.) | | 581 | 557 | 656 | 657 | 667 |

As apparent from Tables 1 to 4, the glasses according to the Examples of the present invention each have optical constants sufficient for the optical glass, including a high refractive index ($n_d$) of 1.6 or more as well as a high Abbe number ($v_d$).

Furthermore, generation of cloudiness on the molded surface upon molding was satisfactorily restricted.

These results show that the optical glass of the present invention has favorable characteristics allowing mass production.

Furthermore, the glasses of the Examples of the present invention each have a deformation point (At) falling within a relatively low temperature range of 530° C. or lower, which facilitates molding thereof.

It is apparent from the foregoing that the glass of the present invention is suitable for precision-mold press molding.

On the other hand, the glasses of Comparative Examples 1 to 5 each have a high deformation point (At), causing severe deterioration of the mold.

INDUSTRIAL APPLICABILITY

The optical glass according to the present invention has industrial applications as an optical glass which has a high refractive index, a high Abbe number, a low glass transition temperature, and a low deformation point, which is unlikely to suffer generation of cloudiness upon precision-mold press molding and is excellent in resistance to devitrification, and which is particularly suitable for forming an aspherical lens and the like and is also suitable for mass production.

The invention claimed is:

1. An optical glass containing:
   1.0-4.5 wt. % $SiO_2$,
   30.5-50.0 wt. % $B_2O_3$,
   1.1-8.0 wt. % $Li_2O$,
   10.1-19.5 wt % BaO,
   15.5-30.0 wt. % ZnO,
   3.0-15.0 wt. % $Y_2O_3$ and
   10.0-19.5 wt. % $La_2O_3$.

2. The optical glass according to claim 1, further containing $Yb_2O_3$ in the amount of 3.0 wt. % or less.

3. The optical glass according to claim 1, further containing $Yb_2O_3$ and $Gd_2O_3$ in an amount of 9.0 wt. % or less in total.

4. The optical glass according to claim 1, further containing at lease one of:
   5.0 wt. % or less $GeO_2$,
   5.0 wt. % or less $Al_2O_3$,
   10.0 wt. % or less $Na_2O$,
   10.0 wt. % or less $K_2O$,
   10.0 wt. % or less MgO,
   10.0 wt. % or less CaO,
   10.0 wt. % or less SrO,
   10.0 wt. % or less $ZrO_2$,
   10.0 wt. % or less $Nb_2O_5$,
   10.0 wt. % or less $Ta_2O_5$,
   10.0 wt. % or less $WO_3$,
   5.0 wt. % or less $ZnF_2$,
   5.0 wt. % or less $BaF_2$, and
   4.0 wt. % or less F.

5. An optical glass containing:
   1.0-4.0 wt. % $SiO_2$,
   34.0-40.0 wt. % $B_2O_3$,
   3.0-8.0 wt. % $Li_2O$,
   1.0-4.0 wt. % $Na_2O$,
   11.0-18.0 wt. % BaO,
   15.5-25.0 wt. % ZnO,
   3.0-6.0 wt. % $Y_2O_3$,
   10.0-15.0 wt. % $La_2O_3$,
   3.0-8.0 wt. % $Gd_2O_3$,
   0.5-5.0 wt. % $ZrO_2$, and
   0.5-5.0 wt. % $Al_2O_3$.

6. The optical glass according to claim 1, having a refractive index (nd) of 1.60 to 1.70, an Abbe number (vd) of 45 to 60, a glass transition point (Tg) of 500 C or lower, and a glass deformation point (At) of 530° C. or lower.

7. The optical glass according to claim 2, further containing $Yb_2O_3$ and $Gd_2O_3$ in an amount of 9.0 wt. % or less in total.

8. The optical glass according to claim 2, further containing at lease one of:
   5.0 wt. % or less $GeO_2$,
   5.0 wt. % or less $Al_2O_3$,
   10.0 wt. % or less $Na_2O$,
   10.0 wt. % or less $K_2O$,
   10.0 wt. % or less MgO,
   10.0 wt. % or less CaO,
   10.0 wt. % or less SrO,
   10.0 wt. % or less $ZrO_2$,
   10.0 wt. % or less $Nb_2O_5$,
   10.0 wt. % or less $Ta_2O_5$,
   10.0 wt. % or less $WO_3$,
   5.0 wt. % or less $ZnF_2$,
   5.0 wt. % or less $BaF_2$, and
   4.0 wt. % or less F.

9. The optical glass according to claim 3, further containing at lease one of:
   5.0 wt. % or less $GeO_2$,
   5.0 wt. % or less $Al_2O_3$,
   10.0 wt. % or less $Na_2O$,
   10.0 wt. % or less $K_2O$,
   10.0 wt. % or less MgO,
   10.0 wt. % or less CaO,
   10.0 wt. % or less SrO,
   10.0 wt. % or less $ZrO_2$,
   10.0 wt. % or less $Nb_2O_5$,
   10.0 wt. % or less $Ta_2O_5$,
   10.0 wt. % or less $WO_3$,
   5.0 wt. % or less $ZnF_2$,
   5.0 wt. % or less $BaF_2$, and
   4.0 wt. % or less F.

10. The optical glass according to claim 2, having a refractive index (nd) of 1.60 to 1.70, an Abbe number (vd) of 45 to 60, a glass transition point (Tg) of 500 C or lower, and a glass deformation point (At) of 530° C. or lower.

11. The optical glass according to claim 3, having a refractive index (nd) of 1.60 to 1.70, an Abbe number (vd) of 45 to 60, a glass transition point (Tg) of 500° C. or lower, and a glass deformation point (At) of 530° C. or lower.

12. The optical glass according to claim 4, having a refractive index (nd) of 1.60 to 1.70, an Abbe number (vd) of 45 to 60, a glass transition point (Tg) of 500° C. or lower, and a glass deformation point (At) of 530° C. or lower.

13. The optical glass according to claim 5, having a refractive index (nd) of 1.60 to 1.70, an Abbe number (vd) of 45 to 60, a glass transition point (Tg) of 500° C. or lower, and a glass deformation point (At) of 530° C. or lower.

* * * * *